(12) United States Patent
Dawson et al.

(10) Patent No.: US 11,453,618 B2
(45) Date of Patent: Sep. 27, 2022

(54) CERAMIC SINTERING

(71) Applicant: Utility Global, Inc., Houston, TX (US)

(72) Inventors: Matthew Dawson, Katy, TX (US); Nicholas Farandos, Bray (IE); Jin Dawson, Katy, TX (US)

(73) Assignee: Utility Global, Inc., Houston, TX (US)

( * ) Notice: Subject to any disclaimer, the term of this patent is extended or adjusted under 35 U.S.C. 154(b) by 0 days.

(21) Appl. No.: 17/030,000

(22) Filed: Sep. 23, 2020

(65) Prior Publication Data
US 2021/0024425 A1     Jan. 28, 2021

Related U.S. Application Data

(63) Continuation-in-part of application No. 15/931,585, filed on May 14, 2020, which is a continuation-in-part
(Continued)

(30) Foreign Application Priority Data

Dec. 12, 2019    (TW) ................................ 108145555

(51) Int. Cl.
| | | |
|---|---|---|
| *C04B 35/64* | (2006.01) | |
| *B28B 19/00* | (2006.01) | |
| *B28B 1/00* | (2006.01) | |
| *C04B 35/63* | (2006.01) | |

(Continued)

(52) U.S. Cl.
CPC .............. *C04B 35/64* (2013.01); *B28B 1/001* (2013.01); *B28B 19/0092* (2013.01);
(Continued)

(58) Field of Classification Search
CPC ....... B28B 1/001; B28B 11/24; B28B 11/241; B28B 11/242; B28B 19/0092; B05D 1/02;
(Continued)

(56) References Cited

U.S. PATENT DOCUMENTS

| | | | | |
|---|---|---|---|---|
| 4,799,936 A | * | 1/1989 | Riley ................. | H01M 8/2435 429/495 |
| 4,855,102 A | * | 8/1989 | Okada ...................... | B22F 7/06 419/23 |

(Continued)

FOREIGN PATENT DOCUMENTS

| | | |
|---|---|---|
| KR | 10-2006-0024244 A | 3/2006 |
| KR | 10-2014-0050093 A | 4/2014 |

OTHER PUBLICATIONS

International Search Report and Written Opinion in International Patent Application No. PCT/US2020/052277 dated Jan. 8, 2021.

*Primary Examiner* — Brian K Talbot
(74) *Attorney, Agent, or Firm* — Foley & Lardner LLP

(57) ABSTRACT

Herein discussed is a method of sintering a ceramic comprising (a) providing an electromagnetic radiation (EMR) source; (b) (i) providing a layer of intermixed ceramic particles and absorber particles, wherein the absorber particles have a volume fraction in the intermixed particles in the range of no less than 3%; or (ii) providing a first layer comprising ceramic particles and a second layer comprising absorber particles in contact with at least a portion of the first layer, wherein the second layer is farther from the EMR source than the first layer; (c) heating (i) the layer of intermixed particles or (ii) the first layer using EMR; and (d) controlling the EMR such that at least a portion of the ceramic particles are sintered wherein (i) the layer of intermixed particles becomes impermeable or (ii) the first layer becomes impermeable, wherein the absorber particles have greater EMR absorption than the ceramic particles.

18 Claims, 3 Drawing Sheets

Related U.S. Application Data of application No. 16/775,176, filed on Jan. 28, 2020, which is a continuation-in-part of application No. 16/739,727, filed on Jan. 10, 2020, and a continuation-in-part of application No. 16/739,671, filed on Jan. 10, 2020, and a continuation-in-part of application No. 16/739,612, filed on Jan. 10, 2020, which is a continuation-in-part of application No. 16/707,066, filed on Dec. 9, 2019, now abandoned, and a continuation-in-part of application No. 16/707,046, filed on Dec. 9, 2019, which is a continuation-in-part of application No. 16/699,461, filed on Nov. 29, 2019, and a continuation-in-part of application No. 16/699,453, filed on Nov. 29, 2019, now abandoned, which is a continuation-in-part of application No. 16/693,271, filed on Nov. 23, 2019, now abandoned, and a continuation-in-part of application No. 16/693,270, filed on Nov. 23, 2019, and a continuation-in-part of application No. 16/693,269, filed on Nov. 23, 2019, now abandoned, and a continuation-in-part of application No. 16/693,268, filed on Nov. 23, 2019, now abandoned, which is a continuation-in-part of application No. 16/684,864, filed on Nov. 15, 2019, and a continuation-in-part of application No. 16/684,838, filed on Nov. 15, 2019, which is a continuation-in-part of application No. 16/680,770, filed on Nov. 12, 2019, which is a continuation-in-part of application No. 16/674,695, filed on Nov. 5, 2019, and a continuation-in-part of application No. 16/674,580, filed on Nov. 5, 2019, said application No. 16/680,770 is a continuation-in-part of application No. 16/674,629, filed on Nov. 5, 2019, said application No. 16/739,612 is a continuation-in-part of application No. 16/674,657, filed on Nov. 5, 2019, said application No. 16/775,176 is a continuation-in-part of application No. 16/707,084, filed on Dec. 9, 2019, now abandoned, and a continuation-in-part of application No. 16/739,748, filed on Jan. 10, 2020.

(60) Provisional application No. 62/904,683, filed on Sep. 24, 2019, provisional application No. 62/756,264, filed on Nov. 6, 2018, provisional application No. 62/756,257, filed on Nov. 6, 2018, provisional application No. 62/757,751, filed on Nov. 8, 2018, provisional application No. 62/758,778, filed on Nov. 12, 2018, provisional application No. 62/767,413, filed on Nov. 14, 2018, provisional application No. 62/768,864, filed on Nov. 17, 2018, provisional application No. 62/771,045, filed on Nov. 24, 2018, provisional application No. 62/773,071, filed on Nov. 29, 2018, provisional application No. 62/773,912, filed on Nov. 30, 2018, provisional application No. 62/777,273, filed on Dec. 10, 2018, provisional application No. 62/777,338, filed on Dec. 10, 2018, provisional application No. 62/779,005, filed on Dec. 13, 2018, provisional application No. 62/780,211, filed on Dec. 15, 2018, provisional application No. 62/783,192, filed on Dec. 20, 2018, provisional application No. 62/784,472, filed on Dec. 23, 2018, provisional application No. 62/786,341, filed on Dec. 29, 2018, provisional application No. 62/791,629, filed on Jan. 11, 2019, provisional application No. 62/797,572, filed on Jan. 28, 2019, provisional application No. 62/798,344, filed on Jan. 29, 2019, provisional application No. 62/804,115, filed on Feb. 11, 2019, provisional application No. 62/805,250, filed on Feb. 13, 2019, provisional application No. 62/808,644, filed on Feb. 21, 2019, provisional application No. 62/809,602, filed on Feb. 23, 2019, provisional application No. 62/814,695, filed on Mar. 6, 2019, provisional application No. 62/819,374, filed on Mar. 15, 2019, provisional application No. 62/819,289, filed on Mar. 15, 2019, provisional application No. 62/824,229, filed on Mar. 26, 2019, provisional application No. 62/825,576, filed on Mar. 28, 2019, provisional application No. 62/827,800, filed on Apr. 1, 2019, provisional application No. 62/834,531, filed on Apr. 16, 2019, provisional application No. 62/837,089, filed on Apr. 22, 2019, provisional application No. 62/840,381, filed on Apr. 29, 2019, provisional application No. 62/844,126, filed on May 7, 2019, provisional application No. 62/844,127, filed on May 7, 2019, provisional application No. 62/847,472, filed on May 14, 2019, provisional application No. 62/849,269, filed on May 17, 2019, provisional application No. 62/852,045, filed on May 23, 2019, provisional application No. 62/856,736, filed on Jun. 3, 2019, provisional application No. 62/863,390, filed on Jun. 19, 2019, provisional application No. 62/864,492, filed on Jun. 20, 2019, provisional application No. 62/866,758, filed on Jun. 26, 2019, provisional application No. 62/869,322, filed on Jul. 1, 2019, provisional application No. 62/875,437, filed on Jul. 17, 2019, provisional application No. 62/877,699, filed on Jul. 23, 2019, provisional application No. 62/888,319, filed on Aug. 16, 2019, provisional application No. 62/895,416, filed on Sep. 3, 2019, provisional application No. 62/896,466, filed on Sep. 5, 2019, provisional application No. 62/899,087, filed on Sep. 11, 2019, provisional application No. 62/904,683, filed on Sep. 24, 2019, provisional application No. 62/912,626, filed on Oct. 8, 2019, provisional application No. 62/925,210, filed on Oct. 23, 2019, provisional application No. 62/927,627, filed on Oct. 29, 2019, provisional application No. 62/928,326, filed on Oct. 30, 2019, provisional application No. 62/934,808, filed on Nov. 13, 2019, provisional application No. 62/939,531, filed on Nov. 22, 2019, provisional application No. 62/941,358, filed on Nov. 27, 2019, provisional application No. 62/944,259, filed on Dec. 5, 2019, provisional application No. 62/944,756, filed on Dec. 6, 2019, provisional application No. 62/948,759, filed on Dec. 16, 2019, provisional application No. 62/955,443, filed on Dec. 31, 2019, provisional application No. 62/970,655, filed on Feb. 5, 2020, provisional application No. 62/982,919, filed on Feb. 28, 2020, provisional application No. 62/987,706, filed on Mar. 10, 2020, provisional application No. 62/994,645, filed on Mar. 25, 2020.

(51) Int. Cl.
*B05D 3/06* (2006.01)
*B05D 3/00* (2006.01)
*B05D 1/02* (2006.01)
*B28B 11/24* (2006.01)
*B05D 1/12* (2006.01)
*B05D 7/00* (2006.01)
*B05D 3/14* (2006.01)

(52) U.S. Cl.
CPC ............ *C04B 35/6303* (2013.01); *B05D 1/02* (2013.01); *B05D 1/12* (2013.01); *B05D 3/065* (2013.01); *B05D 3/145* (2013.01); *B05D 3/207* (2013.01); *B05D 7/52* (2013.01); *B28B 11/24* (2013.01); *B28B 11/241* (2013.01); *B28B 11/242* (2013.01); *C04B 2235/3279* (2013.01); *C04B 2235/5472* (2013.01); *C04B 2235/667* (2013.01); *C04B 2235/70* (2013.01)

(58) Field of Classification Search
CPC .......... B05D 1/12; B05D 3/065; B05D 3/145; B05D 3/207; B05D 7/52; C04B 35/64; C04B 35/6303; C04B 2235/3279; C04B 2235/5472; C04B 2235/667; C04B 2235/70
USPC .................................. 427/189–192; 264/113
See application file for complete search history.

(56) References Cited

U.S. PATENT DOCUMENTS

| | | | | |
|---|---|---|---|---|
| 5,102,592 | A * | 4/1992 | McCauley | C04B 35/584 501/97.3 |
| 5,321,223 | A * | 6/1994 | Kimrey, Jr. | C04B 35/62802 219/745 |
| 5,863,468 | A * | 1/1999 | Czubarow | H01C 17/281 252/519.5 |
| 7,265,161 | B2 * | 9/2007 | Leatherdale | G03F 7/038 522/83 |
| 9,115,034 | B2 * | 8/2015 | Petit | B23K 26/355 |
| 9,200,370 | B2 * | 12/2015 | Doye | C23C 18/14 |
| 10,201,947 | B2 * | 2/2019 | Gupta | H02S 40/22 |
| 2003/0027033 | A1 * | 2/2003 | Seabaugh | C04B 41/009 429/489 |
| 2006/0016805 | A1 | 1/2006 | Del Regno | |
| 2008/0280189 | A1 * | 11/2008 | Kesler | H01M 4/9025 429/495 |
| 2011/0053041 | A1 * | 3/2011 | Tucker | C22C 32/0021 429/486 |
| 2011/0223509 | A1 * | 9/2011 | Greiner | H01M 4/8885 429/452 |
| 2012/0329659 | A1 | 12/2012 | Holcomb | |
| 2014/0314613 | A1 | 10/2014 | Hopkinson et al. | |
| 2015/0147572 | A1 * | 5/2015 | Sato | B22F 1/00 428/402 |
| 2016/0007455 | A1 * | 1/2016 | Kawato | H05K 3/1283 428/457 |
| 2016/0368057 | A1 * | 12/2016 | Hopkins | B22F 1/0014 |
| 2017/0098857 | A1 * | 4/2017 | Carlson | H01M 10/4235 |
| 2019/0051906 | A1 * | 2/2019 | Rhee | B01D 67/0088 |

* cited by examiner

CERAMIC SINTERING

CROSS-REFERENCE TO RELATED APPLICATIONS

This application is a continuation-in-part application of U.S. patent application Ser. No. 15/931,585 filed May 14, 2020, which is a continuation-in-part application of U.S. patent application Ser. No. 16/775,176, filed Jan. 28, 2020, which is a continuation-in-part application of U.S. patent application Ser. Nos. 16/739,612, 16/739,671, 16/739,727, and 16/739,748, filed Jan. 10, 2020, which are continuation-in-part applications of U.S. patent application Ser. Nos. 16/707,046, 16/707,066 and 16/707,084, filed Dec. 9, 2019, which are continuation-in-part applications of U.S. patent application Ser. Nos. 16/699,453 and 16/699,461, filed Nov. 29, 2019, which are continuation-in-part applications of U.S. patent application Ser. Nos. 16/693,268, 16/693,269, 16/693,270, and 16/693,271, filed Nov. 23, 2019, which are continuation-in-part applications of U.S. patent application Ser. Nos. 16/684,838 and 16/684,864 filed Nov. 15, 2019, which are continuation-in-part applications of U.S. patent application Ser. No. 16/680,770 filed Nov. 12, 2019, which is a continuation-in-part application of U.S. patent application Ser. Nos. 16/674,580, 16/674,629, 16/674,657, 16/674,695 all filed Nov. 5, 2019, each of which claims the benefit under 35 U.S.C. 119(e) of U.S. Provisional Patent Application No. 62/756,257 filed Nov. 6, 2018, U.S. Provisional Patent Application No. 62/756,264 filed Nov. 6, 2018, U.S. Provisional Patent Application No. 62/757,751 filed Nov. 8, 2018, U.S. Provisional Patent Application No. 62/758,778 filed Nov. 12, 2018, U.S. Provisional Patent Application No. 62/767,413 filed Nov. 14, 2018, U.S. Provisional Patent Application No. 62/768,864 filed Nov. 17, 2018, U.S. Provisional Patent Application No. 62/771,045 filed Nov. 24, 2018, U.S. Provisional Patent Application No. 62/773,071 filed Nov. 29, 2018, U.S. Provisional Patent Application No. 62/773,912 filed Nov. 30, 2018, U.S. Provisional Patent Application No. 62/777,273 filed Dec. 10, 2018, U.S. Provisional Patent Application No. 62/777,338 filed Dec. 10, 2018, U.S. Provisional Patent Application No. 62/779,005 filed Dec. 13, 2018, U.S. Provisional Patent Application No. 62/780,211 filed Dec. 15, 2018, U.S. Provisional Patent Application No. 62/783,192 filed Dec. 20, 2018, U.S. Provisional Patent Application No. 62/784,472 filed Dec. 23, 2018, U.S. Provisional Patent Application No. 62/786,341 filed Dec. 29, 2018, U.S. Provisional Patent Application No. 62/791,629 filed Jan. 11, 2019, U.S. Provisional Patent Application No. 62/797,572 filed Jan. 28, 2019, U.S. Provisional Patent Application No. 62/798,344 filed Jan. 29, 2019, U.S. Provisional Patent Application No. 62/804,115 filed Feb. 11, 2019, U.S. Provisional Patent Application No. 62/805,250 filed Feb. 13, 2019, U.S. Provisional Patent Application No. 62/808,644 filed Feb. 21, 2019, U.S. Provisional Patent Application No. 62/809,602 filed Feb. 23, 2019, U.S. Provisional Patent Application No. 62/814,695 filed Mar. 6, 2019, U.S. Provisional Patent Application No. 62/819,374 filed Mar. 15, 2019, U.S. Provisional Patent Application No. 62/819,289 filed Mar. 15, 2019, U.S. Provisional Patent Application No. 62/824,229 filed Mar. 26, 2019, U.S. Provisional Patent Application No. 62/825,576 filed Mar. 28, 2019, U.S. Provisional Patent Application No. 62/827,800 filed Apr. 1, 2019, U.S. Provisional Patent Application No. 62/834,531 filed Apr. 16, 2019, U.S. Provisional Patent Application No. 62/837,089 filed Apr. 22, 2019, U.S. Provisional Patent Application No. 62/840,381 filed Apr. 29, 2019, U.S. Provisional Patent Application No. 62/844,125 filed May 7, 2019, U.S. Provisional Patent Application No. 62/844,127 filed May 7, 2019, U.S. Provisional Patent Application No. 62/847,472 filed May 14, 2019, U.S. Provisional Patent Application No. 62/849,269 filed May 17, 2019, U.S. Provisional Patent Application No. 62/852,045 filed May 23, 2019, U.S. Provisional Patent Application No. 62/856,736 filed Jun. 3, 2019, U.S. Provisional Patent Application No. 62/863,390 filed Jun. 19, 2019, U.S. Provisional Patent Application No. 62/864,492 filed Jun. 20, 2019, U.S. Provisional Patent Application No. 62/866,758 filed Jun. 26, 2019, U.S. Provisional Patent Application No. 62/869,322 filed Jul. 1, 2019, U.S. Provisional Patent Application No. 62/875,437 filed Jul. 17, 2019, U.S. Provisional Patent Application No. 62/877,699 filed Jul. 23, 2019, U.S. Provisional Patent Application No. 62/888,319 filed Aug. 16, 2019, U.S. Provisional Patent Application No. 62/895,416 filed Sep. 3, 2019, U.S. Provisional Patent Application No. 62/896,466 filed Sep. 5, 2019, U.S. Provisional Patent Application No. 62/899,087 filed Sep. 11, 2019, U.S. Provisional Patent Application No. 62/904,683 filed Sep. 24, 2019, U.S. Provisional Patent Application No. 62/912,626 filed Oct. 8, 2019, U.S. Provisional Patent Application No. 62/925,210 filed Oct. 23, 2019, U.S. Provisional Patent Application No. 62/927,627 filed Oct. 29, 2019, U.S. Provisional Patent Application No. 62/928,326 filed Oct. 30, 2019, U.S. Provisional Patent Application No. 62/934,808 filed Nov. 13, 2019, U.S. Provisional Patent Application No. 62/939,531 filed Nov. 22, 2019, U.S. Provisional Patent Application No. 62/941,358 filed Nov. 27, 2019, U.S. Provisional Patent Application No. 62/944,259 filed Dec. 5, 2019, U.S. Provisional Patent Application No. 62/944,756 filed Dec. 6, 2019, U.S. Provisional Patent Application No. 62/948,759 filed Dec. 16, 2019, U.S. Provisional Patent Application No. 62/955,443 filed Dec. 31, 2019, U.S. Provisional Patent Application No. 62/970,655 filed Feb. 5, 2020, U.S. Provisional Patent Application No. 62/982,919 filed Feb. 28, 2020, U.S. Provisional Patent Application No. 62/987,706 filed Mar. 10, 2020, and U.S. Provisional Patent Application No. 62/994,645 filed Mar. 25, 2020. The entire disclosures of each of these listed applications are hereby incorporated herein by reference.

TECHNICAL FIELD

This invention generally relates to sintering of materials. More specifically, this invention relates to ceramic sintering.

BACKGROUND

Ceramics are a category of materials that have found many applications due to their hard, heat-resistant, and corrosion-resistant properties. Before a ceramic is utilized, a sintering process is needed. Sintering is the process of compacting and forming a solid mass of material by heat or pressure without melting it to the point of liquefaction. Ceramic sintering is typically performed by firing the ceramic in a furnace. Some advanced applications of ceramics include bioceramics, gas turbine engines, watch making, and electrochemical devices. For example, solid oxide fuel cell (SOFC) is a type of electrochemical devices that ceramics are useful in. The electrolyte in a SOFC is a necessary and important part of the device, which is often a ceramic material. The manufacturing of electrolytes is a complex and expensive process, which includes a sintering step. Sintering of the electrolyte as a ceramic is conventionally performed in a furnace. Herein we disclose processes and systems that are able to achieve ceramic sintering without the use of a furnace.

SUMMARY

Herein discussed is a method of sintering a ceramic. We have unexpectedly found a method of ceramic sintering that does not involve the use of a furnace, but rather the use of electromagnetic radiation (EMR). Ceramic sintering using EMR is able to produce materials that is impermeable. In an embodiment, the method comprises (a) providing an electromagnetic radiation (EMR) source; (b) (i) providing a layer of intermixed ceramic particles and absorber particles, wherein the absorber particles have a volume fraction in the intermixed particles in the range of no less than 3%; or (ii) providing a first layer comprising ceramic particles and a second layer comprising absorber particles in contact with at least a portion of the first layer, wherein the second layer is farther from the EMR source than the first layer; (c) heating (i) the layer of intermixed particles or (ii) the first layer using EMR; and (d) controlling the EMR such that at least a portion of the ceramic particles are sintered wherein (i) the layer of intermixed particles becomes impermeable or (ii) the first layer becomes impermeable, wherein the absorber particles have greater EMR absorption than the ceramic particles.

In an embodiment, the ceramic particles comprise lanthanum strontium cobalt ferrite (LSCF), lanthanum strontium manganite (LSM), yttria-stabilized zirconia (YSZ), gadolinia-doped ceria (CGO), samaria-doped ceria (SDC), scandia-stabilized zirconia (SSZ), lanthanum strontium gallium magnesium oxide (LSGM), ceria-yttria stabilized zirconia (CYZ), ceria-scandia stabilized zirconia (CSZ), zirconia, lanthanum chromite, doped lanthanum chromite, or combinations thereof. In an embodiment, the absorber particles comprise NiO, CuO, $Cu_2O$, LSCF, LSM, YSZ, doped YSZ, colored zirconia, lanthanum chromite, doped lanthanum chromite, carbon, graphite, graphene, or combinations thereof.

In various embodiments, colored zirconia includes zirconia that is treated via high temperature, oxidation, or reduction. Such zirconia may be doped with various oxides, such as magnesia (MgO), calcia (CaO), ceria (CeO2), yttria (Y2O3), or iron oxide (Fe2O3). In various embodiments, doped YSZ includes YSZ that is doped with CeO2 or Fe2O3. Doped YSZ also includes pigment doped YSZ. In various embodiments, doped lanthanum chromite includes lanthanum calcium chromite, lanthanum strontium chromite, iron and strontium doped lanthanum chromite, such as $(La_ySr_{(1-y)})_zCr_{(1-z)}Fe_{(1-z)}O_{3-x}$.

In an embodiment, the method comprises providing an insulator layer that supports at least a portion of (i) the layer of the intermixed particles or (ii) the second layer, wherein the insulator layer is farther from the EMR source than the layer of the intermixed particles or the second layer. In an embodiment, the insulator comprises wood, wool, tile, foam, ceramic, alumina, felt, alumina felt, or combinations thereof.

In an embodiment, controlling the EMR comprises controlling exposure duration, exposure frequency, number of exposures, exposure distance, capacitor voltage, or combinations thereof. In an embodiment, the EMR comprises UV light, near ultraviolet light, near infrared light, infrared light, visible light, laser, electron beam, microwave, or combinations thereof. In an embodiment, the absorber particles transfer heat to the ceramic particles.

In an embodiment, the EMR source comprises a xenon lamp. In an embodiment, the thickness of the layer of intermixed particles is no greater than 500 microns. In an embodiment, the thickness of the first layer is no greater than 10 microns.

In an embodiment, the absorber particles have a volume fraction in the intermixed particles in the range of no less than 5% or no less than 10% or no less than 20% or no less than 30% or no less than 50%.

In an embodiment, (b) providing comprises depositing the intermixed particles, the ceramic particles, or the absorber particles on a substrate, wherein depositing comprises material jetting, binder jetting, ultrasonic jetting, ultrasonic spraying, inkjet printing, aerosol jetting, aerosol jet printing, ultrasonic inkjet printing, or combinations thereof.

In an embodiment, the absorber particles do not exceed their melting temperature for greater than 10 consecutive seconds, or greater than 1 consecutive second, or greater than 100 consecutive milliseconds, or greater than 10 consecutive milliseconds.

In an embodiment, wherein the ceramic particles have a size distribution that has at least one of the following characteristics: the size distribution comprises D10 and D90, wherein 10% of the particles have a diameter no greater than D10 and 90% of the particles have a diameter no greater than D90, wherein D90/D10 is in the range of from 1.5 to 100; or the size distribution is bimodal such that the average particle size in the first mode is at least 5 times the average particle size in the second mode; or the size distribution comprises D50, wherein 50% of the particles have a diameter no greater than D50, wherein D50 is no greater than 400 nm. In an embodiment, D10 is in the range of from 5 nm to 50 nm or from 5 nm to 100 nm or from 5 nm to 200 nm, or D90 is in the range of from 50 nm to 500 nm or from 50 nm to 1000 nm, or wherein D90/D10 is in the range of from 2 to 100 or from 4 to 100 or from 2 to 20 or from 2 to 10 or from 4 to 20 or from 4 to 10.

In an embodiment, a first 10 wt % or more of the ceramic particles have an average diameter of d, a second 10 wt % or more of the ceramic particles have an average diameter of at least 5×d, and a third 10 wt % or more of the ceramic particles have an average diameter of at least 20×d. In an embodiment, d is in the range of from 1 nm to 100 nm or from 5 nm to 50 nm or from 10 nm to 30 nm. In an embodiment, the third 10 wt % or more of the ceramic particles have an average of diameter of at least 36×d or at least 50×d or at least 100×d. In an embodiment, the second 10 wt % or more of the ceramic particles have an average of diameter of at least 6×d or at least 7×d or at least 8×d or at least 10×d.

Further aspects and embodiments are provided in the following drawings, detailed description and claims. Unless specified otherwise, the features as discussed herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1A:
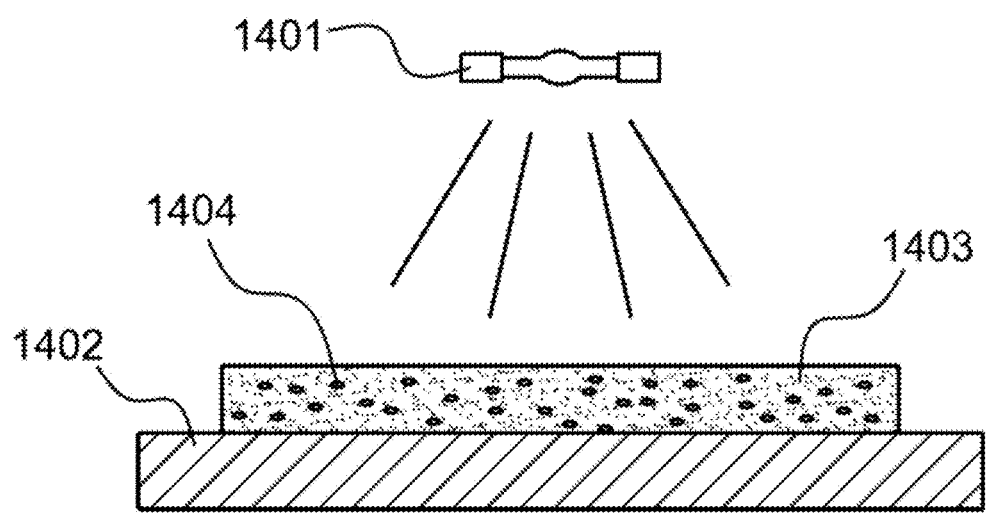
FIG. 1A illustrates (not to scale) ceramic sintering using EMR, wherein ceramic particles are intermixed with absorber particles, according to an embodiment of this disclosure.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like. As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

In situ in this disclosure refers to the treatment (e.g., heating) process being performed either at the same location or in the same device of the forming process of the compositions or materials. For example, the deposition process and the heating process are performed in the same device and at the same location, in other words, without changing the device and without changing the location within the device. For example, the deposition process and the heating process are performed in the same device at different locations, which is also considered in situ.

As used herein, lateral refers to the direction that is perpendicular to the stacking direction of the layers in a non-SIS type fuel cell. Thus, lateral direction refers to the direction that is perpendicular to the stacking direction of the layers in a fuel cell or the stacking direction of the slices to form an object during deposition. Lateral also refers to the direction that is the spread of deposition process.

In this disclosure, absorbance is a measure of the capacity of a substance to absorb electromagnetic radiation (EMR) of a wavelength. Absorption of radiation refers to the energy absorbed by a substance when exposed to the radiation.

An impermeable layer or being impermeable as used herein refers to a layer or property that is impermeable to fluid flow. For example, an impermeable layer has a permeability of no greater than 10 micro darcy, or no greater than 10 nano darcy. Alternatively, being impermeable refers to a permeability of no greater than 10 micro darcy, or no greater than 10 nano darcy.

In this disclosure, sintering refers to a process to form a solid mass of material by heat or pressure or combination thereof without melting the material to the extent of liquefaction. For example, material particles are coalesced into a solid or porous mass by being heated, wherein atoms in the material particles diffuse across the boundaries of the particles, causing the particles to fuse together and form one solid piece. In this disclosure and the appended claims, $T_{sinter}$ refers to the temperature at which this phenomenon begins to take place.

As used herein, the term "absorber particles" refer to particles that have greater absorption of energy than ceramic particles for a given electromagnetic radiation (EMR) spectrum. For example, when the ceramic particles are CGO, absorber particles are copper oxide particles or LSCF particles. For example, when the ceramic particles are YSZ, absorber particles are copper oxide particles or LSCF particles or CuO—CGO particles or colored zirconia particles or doped YSZ particles. In this disclosure, the absorber particles having no appreciable flow if they are melted means that the layer comprising the absorber particles has a change in one dimension (length, width, height) by no more than 10% or by no more than 5% or by no more than 1%.

In this disclosure, an insulator, such as that used in the insulator layer refers to a substance that does not readily allow the passage of heat. For example, an insulator has a thermal conductivity of no greater than 1 W/(m K). Preferably, the insulator has a thermal conductivity of no greater than 0.1 W/(m K).

This discussion takes the production of solid oxide fuel cells (SOFCs) as an example. Other examples of electrochemical device include electrochemical (EC) gas producer, electrochemical (EC) compressor, and batteries. As one in the art recognizes, the methodology and the manufacturing process are applicable to any device, reactor, vessel, catalyst, wherein sintered ceramics have found uses.

Ceramic Sintering

Ceramics are a category of materials that have high melting temperatures. Existing sintering technologies require large amounts of energy expenditure of an energy source to sinter ceramics. Contrary to conventional wisdom, we have unexpectedly discovered ceramic sintering processes that require much less energy expenditure and much less time than what is traditionally needed. Such processes utilize electromagnetic radiation (EMR). For example, without the processes as disclosed herein, an EMR source just sufficient to sinter a ceramic material has power capacity P.

With the processes as disclosed herein, the ceramic material is sintered with EMR sources having much less power capacity, e.g., 50% P or less, 40% P or less, 30% P or less, 20% P or less, 10% P or less, 5% P or less.

Figure 1B:
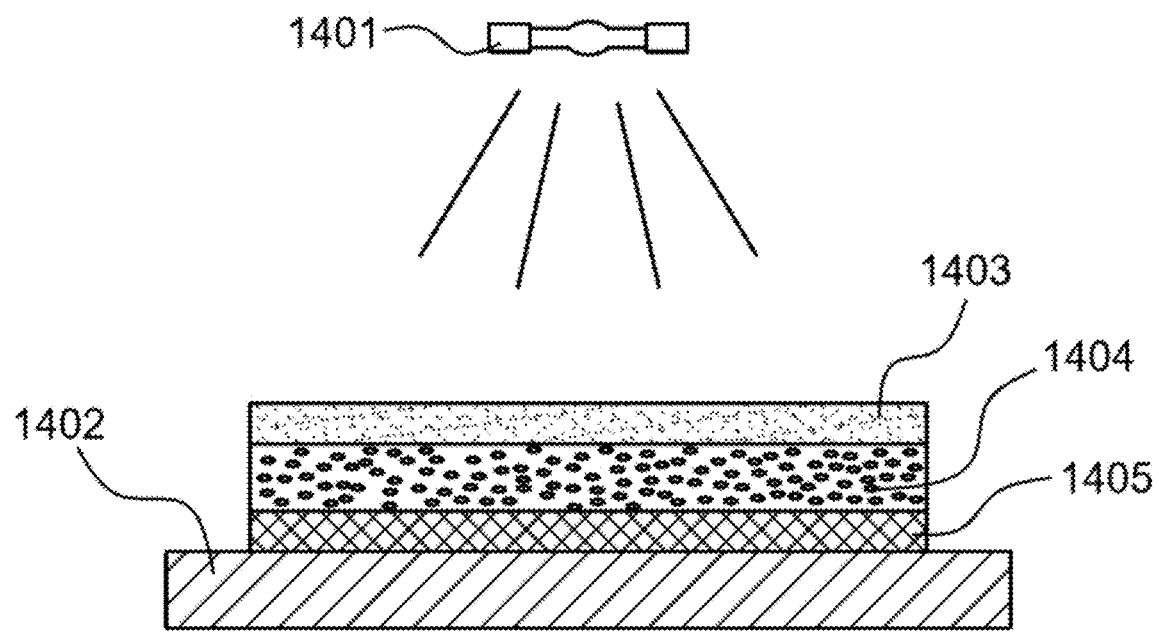
FIG. 1B illustrates (not to scale) ceramic sintering using EMR, wherein ceramic particles are in contact with absorber particles and absorber particles are in contact with an insulator, according to an embodiment of this disclosure.

Referring to FIG. 1A, 1401 represents an EMR source (e.g., a xenon lamp); 1402 represent a substrate; 1403 represents ceramic particles; 1404 represents absorber particles that are intermixed with the ceramic particles, according to an embodiment of this disclosure. Referring to FIG. 1B, 1401 represents an EMR source (e.g., a xenon lamp); 1402 represent a substrate; 1403 represents ceramic particles; 1404 represents absorber particles; 1405 represents an insulator or insulator layer. In this embodiment, the ceramic particles are in contact with the absorber particles and the absorber particles are in contact with the insulator.

Herein discussed is a method of sintering a ceramic comprising (a) providing an electromagnetic radiation (EMR) source; (b) (i) providing a layer of intermixed ceramic particles and absorber particles, wherein the absorber particles have a volume fraction in the intermixed particles in the range of no less than 3%; or (ii) providing a first layer comprising ceramic particles and a second layer comprising absorber particles in contact with at least a portion of the first layer, wherein the second layer is farther from the EMR source than the first layer; (c) heating (i) the layer of intermixed particles or (ii) the first layer using EMR; and (d) controlling the EMR such that at least a portion of the ceramic particles are sintered wherein (i) the layer of intermixed particles becomes impermeable or (ii) the first layer becomes impermeable, wherein the absorber particles have greater EMR absorption than the ceramic particles.

In an embodiment, the ceramic particles comprise lanthanum strontium cobalt ferrite (LSCF), lanthanum strontium manganite (LSM), yttria-stabilized zirconia (YSZ), gadolinia-doped ceria (CGO), samaria-doped ceria (SDC), scandia-stabilized zirconia (SSZ), lanthanum strontium gallium magnesium oxide (LSGM), ceria-yttria stabilized zirconia (CYZ), ceria-scandia stabilized zirconia (CSZ), zirconia, lanthanum chromite, doped lanthanum chromite, or combinations thereof. In an embodiment, the absorber particles comprise NiO, CuO, $Cu_2O$, LSCF, LSM, YSZ, doped YSZ, colored zirconia, lanthanum chromite, doped lanthanum chromite, carbon, graphite, graphene, or combinations thereof. In an embodiment, the absorber particles have a volume fraction in the intermixed particles in the range of no less than 5% or no less than 10% or no less than 20% or no less than 30% or no less than 50%.

In various embodiments, colored zirconia includes zirconia that is treated via high temperature, oxidation, or reduction. Such zirconia may be doped with various oxides, such as magnesia (MgO), calcia (CaO), ceria (CeO2), yttria (Y2O3), or iron oxide (Fe2O3). In various embodiments, doped YSZ includes YSZ that is doped with CeO2 or Fe2O3. Doped YSZ also includes pigment doped YSZ. In various embodiments, doped lanthanum chromite includes lanthanum calcium chromite, lanthanum strontium chromite, iron and strontium doped lanthanum chromite, such as $(La_ySr_{(1-y)})_zCr_{(1-z)}Fe_{(1-z)}O_{3-x}$.

In an embodiment, the method comprises providing an insulator layer that supports at least a portion of (i) the layer of the intermixed particles or (ii) the second layer, wherein the insulator layer is farther from the EMR source than the layer of the intermixed particles or the second layer. In an embodiment, the insulator comprises wood, wool, tile, foam, ceramic, alumina, felt, alumina felt, or combinations thereof. In some cases, the insulator layer is in contact with at least a portion of (i) the layer of the intermixed particles or (ii) the second layer. In some cases, the insulator layer is not in contact with (i) the layer of the intermixed particles or (ii) the second layer.

In an embodiment, controlling the EMR comprises controlling exposure duration, exposure frequency, number of exposures, exposure distance, capacitor voltage, or combinations thereof. In an embodiment, the EMR comprises UV light, near ultraviolet light, near infrared light, infrared light, visible light, laser, electron beam, microwave, or combinations thereof. In an embodiment, the absorber particles transfer heat to the ceramic particles.

In an embodiment, (b) providing comprises depositing the intermixed particles, the ceramic particles, or the absorber particles on a substrate. In various embodiments, depositing comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof. In an embodiment, the thickness of the layer is no greater than 1 mm or 500 microns or 300 microns or 100 microns or 50 microns or 10 microns or 5 microns; or around 1 micron or around 500 nm. In an embodiment, the thickness of the layer of intermixed particles is no greater than 500 microns. In an embodiment, the thickness of the first layer is no greater than 10 microns.

In an embodiment, the EMR source comprises a xenon lamp. In an embodiment, the EMR consists of one exposure, or no greater than 10 exposures, or no greater than 100 exposures, or no greater than 1000 exposures, or no greater than 10,000 exposures. In an embodiment, the EMR has an exposure frequency of $10^{-4}$-1000 Hz or 1-1000 Hz or 10-1000 Hz. In an embodiment, the EMR has an exposure distance of no greater than 50 mm. In an embodiment, the EMR has an exposure duration no less than 0.1 ms or 1 ms. In an embodiment, the EMR is applied with a capacitor voltage of no less than 100V.

In an embodiment, the absorber particles contain metal or ceramic. In an embodiment, the absorber particles are not ceramic. In an embodiment, the absorber particles do not exceed their melting temperature for greater than 10 consecutive seconds, or greater than 1 consecutive second, or greater than 100 consecutive milliseconds, or greater than 10 consecutive milliseconds. In an embodiment, the absorber particles do not have appreciable flow if they are melted.

In an embodiment, wherein the ceramic particles have a size distribution that has at least one of the following characteristics: the size distribution comprises D10 and D90, wherein 10% of the particles have a diameter no greater than D10 and 90% of the particles have a diameter no greater than D90, wherein D90/D10 is in the range of from 1.5 to 100; or the size distribution is bimodal such that the average particle size in the first mode is at least 5 times the average particle size in the second mode; or the size distribution comprises D50, wherein 50% of the particles have a diameter no greater than D50, wherein D50 is no greater than 400 nm. In an embodiment, D50 is no greater than 100 nm. In an embodiment, D10 is in the range of from 5 nm to 50 nm or from 5 nm to 100 nm or from 5 nm to 200 nm, or D90 is in the range of from 50 nm to 500 nm or from 50 nm to 1000 nm, or wherein D90/D10 is in the range of from 2 to 100 or from 4 to 100 or from 2 to 20 or from 2 to 10 or from 4 to 20 or from 4 to 10.

In an embodiment, D50 is no greater than 50 nm, or no greater than 30 nm, or no greater than 20 nm, or no greater than 10 nm, or no greater than 5 nm. In an embodiment, the average particle size in the first mode is at least 10 times or 15 times or 20 times the average particle size in the second mode. In an embodiment, the particles have a diameter in the range of from 1 nm to 1000 nm, wherein D10 is in the range of from 1 nm to 10 nm and D90 is in the range of from 50 nm to 500 nm. Such size distribution is also contemplated for the absorber particles.

In an embodiment, a first 10 wt % or more of the ceramic particles have an average diameter of d, a second 10 wt % or more of the ceramic particles have an average diameter of at least 5×d, and a third 10 wt % or more of the ceramic particles have an average diameter of at least 20×d. In an embodiment, d is in the range of from 1 nm to 100 nm or from 5 nm to 50 nm or from 10 nm to 30 nm. In an embodiment, the third 10 wt % or more of the ceramic particles have an average of diameter of at least 36×d or at least 50×d or at least 100×d. In an embodiment, the second 10 wt % or more of the ceramic particles have an average of diameter of at least 6×d or at least 7×d or at least 8×d or at least 10×d.

In an embodiment, a first 20 wt % or more of the particles have an average diameter of d, a second 20 wt % or more of the particles have an average diameter of at least 5×d, and a third 20 wt % or more of the particles have an average diameter of at least 20×d. In an embodiment, a first 30 wt % or more of the particles have an average diameter of d, a second 30 wt % or more of the particles have an average diameter of at least 5×d, and a third 30 wt % or more of the particles have an average diameter of at least 20×d.

In an embodiment, the second 10 wt % or more of the particles have an average of diameter of at least 6×d and the third 10 wt % or more of the particles have an average of diameter of at least 36×d. In an embodiment, the second 10 wt % or more of the particles have an average of diameter of at least 7×d or 8×d and the third 10 wt % or more of the particles have an average of diameter of at least 50×d. In an embodiment, the second 10 wt % or more of the particles have an average of diameter of at least 10×d and the third 10 wt % or more of the particles have an average of diameter of at least 100×d. Such size distribution is also contemplated for the absorber particles.

Fuel Cell

A fuel cell is an electrochemical apparatus that converts the chemical energy from a fuel into electricity through an electrochemical reaction. There are various types of fuel cells, e.g., proton-exchange membrane fuel cells (PEMFCs), solid oxide fuel cells (SOFCs). A fuel cell typically comprises an anode, a cathode, an electrolyte, an interconnect, optionally a barrier layer and/or optionally a catalyst. The various layers of the SOFC often contain a ceramic material. As such, SOFC is used as an application example for ceramic sintering. The method and system of this disclosure are applicable in other fields where sintered ceramics are utilized.

Both the anode and the cathode are electrodes. The listings of material for the electrodes, the electrolyte, and the interconnect in a fuel cell are applicable in other electrochemical devices, such as gas producer or compressor. These listings are only examples and not limiting. Furthermore, the designations of anode material and cathode material are also not limiting because the function of the material during operation (e.g., whether it is oxidizing or reducing) determines whether the material is used as an anode or a cathode.

Figure 2:
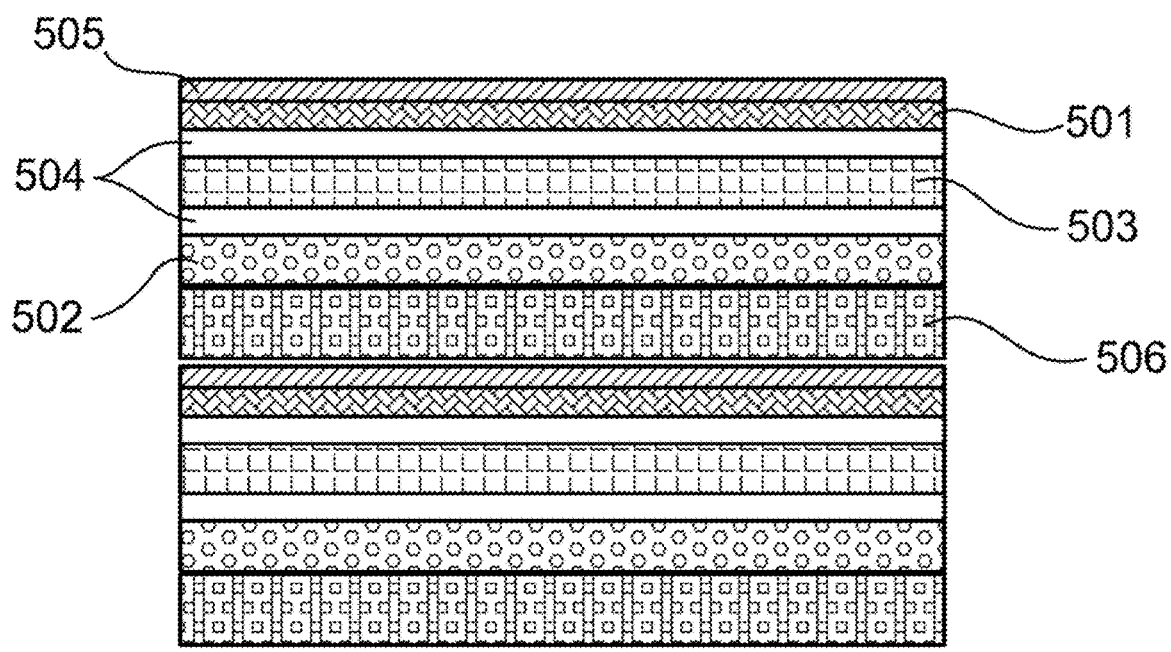
FIG. 2 illustrates a fuel cell stack having two repeat units (or two fuel cells), according to an embodiment of this disclosure.

FIG. 2 depicts two fuel cells in a fuel cell stack. In the illustrated embodiment, the anode, cathode, electrolyte, and interconnect are cuboids or rectangular prisms. Item 501 schematically represents the anode; 502 represents the cathode; 503 represents the electrolyte; 504 represents the barrier layers; 505 represents the catalyst; and 506 represents the interconnect. Two fuel cell repeat units or two fuel cells form a stack as illustrated. As is seen, on one side the interconnect is in contact with the largest surface of the cathode of the top fuel cell (or fuel cell repeat unit) and on the opposite side the interconnect is in contact with the largest surface of the catalyst (optional) or the anode of the bottom fuel cell (or fuel cell repeat unit). These repeat units or fuel cells are connected in parallel by being stacked atop one another and sharing an interconnect in between via direct contact with the interconnect rather than via electrical wiring. This kind of configuration is in contrast to segmented-in-series (SIS) type fuel cells.

Cathode. In an embodiment, the cathode comprises perovskites, such as LSC, LSCF, LSM. In an embodiment, the cathode comprises lanthanum, cobalt, strontium, manganite. In an embodiment, the cathode is porous. In an embodiment, the cathode comprises YSZ, Nitrogen, Nitrogen Boron doped Graphene, La0.6Sr0.4Co0.2Fe0.8O3, SrCo0.5Sc0.5O3, BaFe0.75Ta0.25O3, BaFe0.875Re0.125O3, Ba0.5La0.125Zn0.375NiO3, Ba0.75Sr0.25Fe0.875Ga0.125O3, BaFe0.125Co0.125, Zr0.75O3. In an embodiment, the cathode comprises LSCo, LCo, LSF, LSCoF. In an embodiment, the cathode comprises perovskites LaCoO3, LaFeO3, LaMnO3, (La,Sr)MnO3, LSM-GDC, LSCF-GDC, LSC-GDC. Cathodes containing LSCF are suitable for intermediate-temperature fuel cell operation.

In an embodiment, the cathode comprises a material selected from the group consisting of lanthanum strontium manganite, lanthanum strontium ferrite, and lanthanum strontium cobalt ferrite. In an embodiment, the cathode comprises lanthanum strontium manganite.

Anode. In an embodiment, the anode comprises Copper, Nickle-Oxide, Nickle-Oxide-YSZ, NiO-GDC, NiO-SDC, Aluminum doped Zinc Oxide, Molybdenum Oxide, Lanthanum, strontium, chromite, ceria, perovskites (such as, LSCF [La{1−x}Sr{x}Co{1−y}Fe{y}O3] or LSM [La{1−x}Sr{x}MnO3], where x is usually 0.15-0.2 and y is 0.7 to 0.8). In an embodiment, the anode comprises SDC or BZCYYb coating or barrier layer to reduce coking and sulfur poisoning. In an embodiment, the anode is porous. In an embodiment, the anode comprises combination of electrolyte material and electrochemically active material, combination of electrolyte material and electrically conductive material.

In an embodiment, the anode comprises nickel and yttria stabilized zirconia. In an embodiment, the anode is formed by reduction of a material comprising nickel oxide and yttria stabilized zirconia. In an embodiment, the anode comprises nickel and gadolinium stabilized ceria. In an embodiment, the anode is formed by reduction of a material comprising nickel oxide and gadolinium stabilized ceria.

Electrolyte. In an embodiment, the electrolyte in a fuel cell comprises stabilized zirconia e.g., YSZ, YSZ-8, Y0.16Zr0.84O2. In an embodiment, the electrolyte comprises doped LaGaO3, e.g., LSGM, La0.9Sr0.1Ga0.8Mg0.2O3. In an embodiment, the electrolyte comprises doped ceria, e.g., GDC, Gd0.2Ce0.8O2. In an embodiment, the electrolyte comprises stabilized bismuth oxide e.g., BVCO, Bi2V0.9Cu0.1O5.35.

In an embodiment, the electrolyte comprises zirconium oxide, yttria stabilized zirconium oxide (also known as YSZ, YSZ8 (8mole % YSZ)), ceria, gadolinia, scandia, magnesia, calcia. In an embodiment, the electrolyte is sufficiently impermeable to prevent significant gas transport and prevent significant electrical conduction; and allow ion conductivity.

In an embodiment, the electrolyte comprises doped oxide such as cerium oxide, yttrium oxide, bismuth oxide, lead oxide, lanthanum oxide. In an embodiment, the electrolyte comprises perovskite, such as, LaCoFeO3 or LaCoO3 or Ce0.9Gd0.1O2 (GDC) or Ce0.9Sm0.1O2 (SDC or samaria doped ceria) or scandia stabilized zirconia.

In an embodiment, the electrolyte comprises a material selected from the group consisting of zirconia, ceria, and gallia. In an embodiment, the material is stabilized with a stabilizing material selected from the group consisting of scandium, samarium, gadolinium, and yttrium. In an embodiment, the material comprises yttria stabilized zirconia.

Interconnect. In an embodiment, the interconnect comprises silver, gold, platinum, AISI441, ferritic stainless steel, stainless steel, Lanthanum, Chromium, Chromium Oxide, Chromite, Cobalt, Cesium, Cr2O3. In an embodiment, the anode comprises LaCrO3 coating on Cr2O3 or NiCo2O4 or MnCo2O4 coatings. In an embodiment, the interconnect surface is coated with Cobalt and/or Cesium. In an embodiment, the interconnect comprises ceramics. In an embodiment, the interconnect comprises Lanthanum Chromite or doped Lanthanum Chromite. In an embodiment, the interconnect is made of a material comprising metal, stainless steel, ferritic steel, crofer, lanthanum chromite, silver, metal alloys, nickel, nickel oxide, ceramics, or graphene.

Catalyst. In various embodiments, the fuel cell comprises a catalyst, such as, platinum, palladium, scandia, chromium, cobalt, cesium, CeO2, nickel, nickel oxide, zinc, copper, titantia, ruthenium, rhodium, MoS2, molybdenum, rhenium, vanadium, manganese, magnesium, iron. In various embodiments, the catalyst promotes methane reforming reactions to generate hydrogen and carbon monoxide for them to be oxidized in the fuel cell. Very often, the catalyst is part of the anode, especially nickel anode has inherent methane reforming properties. In an embodiment, the catalyst is between 1%-5%, or 0.1% to 10% by mass. In an embodiment, the catalyst is used on the anode surface or in the anode. In various embodiments, such anode catalysts reduce harmful coking reactions and carbon deposits. In various embodiments, simple oxide version of catalysts is used or perovskite. For example, 2% mass CeO2 catalyst is used for methane-powered fuel cells. In various embodiments, the catalyst is dipped or coated on the anode. In various embodiments, the catalyst is made by additive manufacturing.

Integrated Deposition and Heating

Herein disclosed is a method comprising depositing a composition on a substrate slice by slice to form an object; heating in situ the object using electromagnetic radiation (EMR); wherein said composition comprises a first material and a second material. For example, the first material contains ceramic particles; the second material contains absorber particles.

In various embodiments, heating causes an effect comprising drying, curing, sintering, annealing, sealing, alloying, evaporating, restructuring, foaming, or combinations thereof. In an embodiment, the EMR has a peak wavelength ranging from 10 to 1500 nm and the EMR has a minimum energy density of 0.1 Joule/cm$^2$, wherein the peak wavelength is on the basis of relative irradiance with respect to wavelength. In an embodiment, the EMR comprises UV light, near ultraviolet light, near infrared light, infrared light, visible light, laser, electron beam, microwave, or combinations thereof.

In an embodiment, the EMR has a peak wavelength no less than 200 nm, or 250 nm, or 300 nm, or 400 nm, or 500 nm. In an embodiment, said depositing comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof. In an embodiment, the object does not change location between depositing and heating. In another embodiment, the object changes location between depositing and heating. In an embodiment, the EMR has a power output of no less than 1 W, or 10 W, or 100 W, or 1000 W.

Herein also disclosed is a system comprising at least one deposition nozzle, an electromagnetic radiation (EMR) source, and a deposition receiver, wherein the deposition receiver is configured to receive EMR exposure and deposition at the same location. In some cases, the receiver is configured such that it receives deposition for a first time period, moves to a different location in the system to receive EMR exposure for a second time period.

Figure 3:
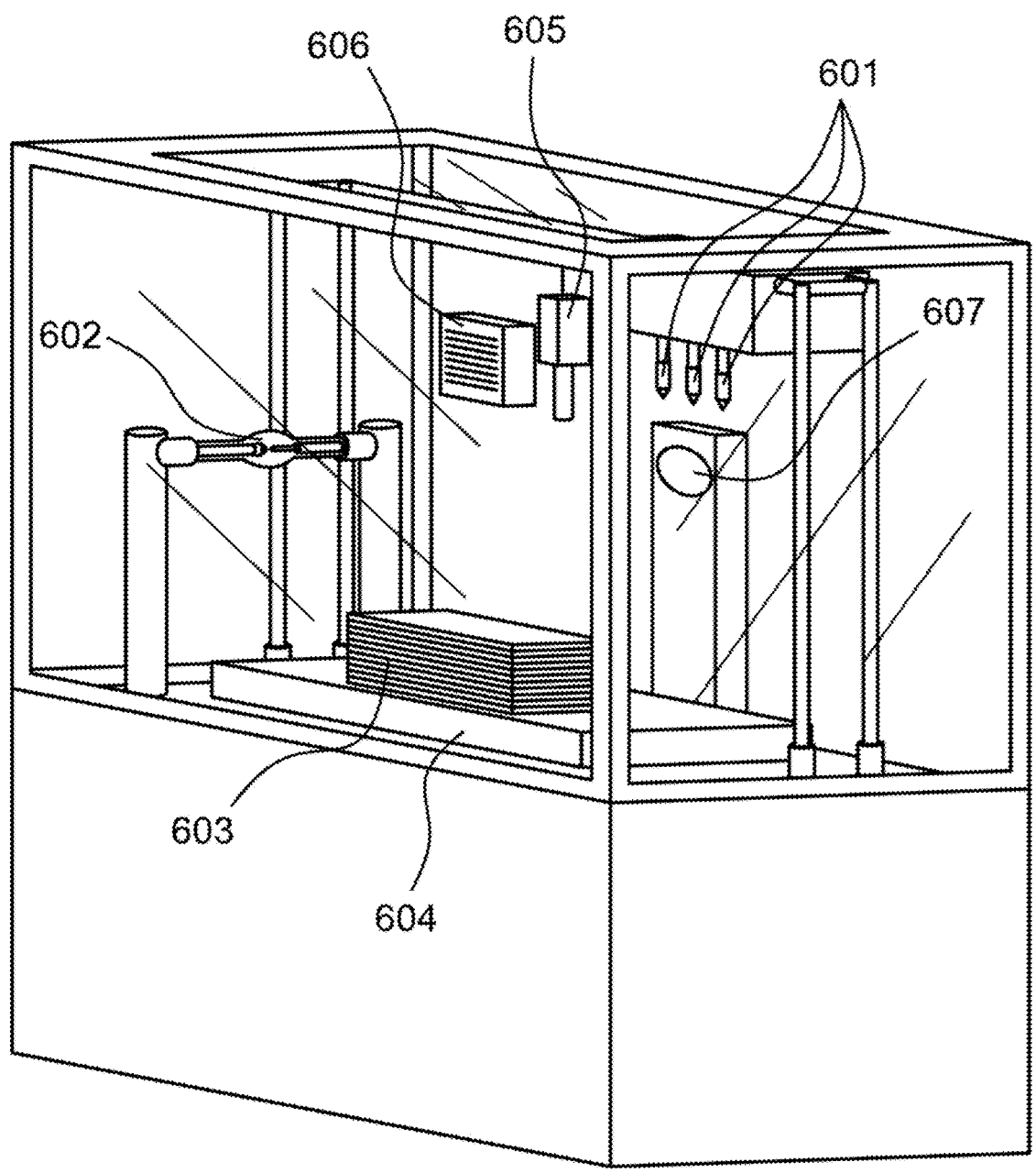
FIG. 3 illustrates a method and system of integrated deposition and heating using electromagnetic radiation (EMR), according to an embodiment of this disclosure.

Referring to FIG. 3, 601 represents deposition nozzles or material jetting nozzles; 602 represents EMR source, e.g., a xenon lamp; 603 represents object being formed; and 604 represents chamber as a part of an additive manufacturing machine (AMM). As illustrated in FIG. 3, the chamber or receiver 604 is configured to receive both deposition from nozzles and radiation from an EMR source. In various embodiments, deposition nozzles 601 are movable. In various embodiments, the chamber or receiver 604 is movable. In various embodiments, the EMR source 602 is movable. In various embodiments, the object comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel, or combinations thereof.

We have further unexpectedly discovered that the heating of a sample using EMR, in some cases, is facilitated by placing a support under the sample if the support has particular properties. For example, a method of forming an object comprises providing a first material as a first layer; depositing a second material on the first layer to form a second layer, wherein the second layer is in contact with the first layer; heating the second layer using an electromagnetic radiation (EMR) source, wherein the second layer is between the first layer and the EMR source; wherein the first material has a density p and a thermal conductivity k, wherein p*k is no less than 345,000 (W kg)/(m$^4$ K) at 300 K. In an embodiment, $\rho$*k is no less than 400,000 (W kg)/(m$^4$ K), or no less than 500,000 (W kg)/(m$^4$ K), or no less than 600,000 (W kg)/(m$^4$ K), or no less than 800,000 (W kg)/(m$^4$ K) at 300 K.

In an embodiment, said second material is the same as the first material. In an embodiment, the second layer has a thickness of no greater than 10 microns, or 8 microns, or 6 microns, or 5 microns, or 4 microns, or 3 microns, or 2 microns, or 1 micron. In an embodiment, depositing the second material and heating the second layer take place without the first layer changing in position.

EXAMPLES

The following examples are provided as part of the disclosure of various embodiments of the present invention. As such, none of the information provided below is to be taken as limiting the scope of the invention.

Example 1. Making a Fuel Cell Stack

The method uses an AMM model no. 0012323 from Ceradrop and an EMR model no. 092309423 from Xenon Corp. An interconnect substrate is put down to start the print.

As a first step, an anode layer is made by the AMM. This layer is deposited by the AMM as a slurry A, having the composition as shown in the table below. This layer is allowed to dry by applying heat via an infrared lamp. This anode layer is sintered by hitting it with an electromagnetic pulse from a xenon flash tube for 1 second.

An electrolyte layer is formed on top of the anode layer by the AMM depositing a slurry B, having the composition shown in the table below. This layer is allowed to dry by applying heat via an infrared lamp. This electrolyte layer is sintered by hitting it with an electromagnetic pulse from a xenon flash tube for 60 seconds.

Next a cathode layer is formed on top of the electrolyte layer by the AMM depositing a slurry C, having the composition shown in the table below. This layer is allowed to dry by applying heat via an infrared lamp. This cathode layer is sintered by hitting it with an electromagnetic pulse from a xenon flash tube for ½ second.

An interconnect layer is formed on top of the cathode layer by the AMM depositing a slurry D, having the composition shown in the table below. This layer is allowed to dry by applying heat via an infrared lamp. This interconnect layer is sintered by hitting it with an electromagnetic pulse from a xenon flash tube for 30 seconds.

These steps are then repeated 60 times, with the anode layers being formed on top of the interconnects. The result is a fuel cell stack with 61 fuel cells.

| Composition of Slurries | | |
|---|---|---|
| Slurry | Solvents | Particles |
| A | 100% isopropyl alcohol | 10 wt % NiO-8YSZ |
| B | 100% isopropyl alcohol | 10 wt % 8YSZ |
| C | 100% isopropyl alcohol | 10 wt % LSCF |
| D | 100% isopropyl alcohol | 10 wt % lanthanum chromite |

Example 2. Sintering Results

Figure 4:
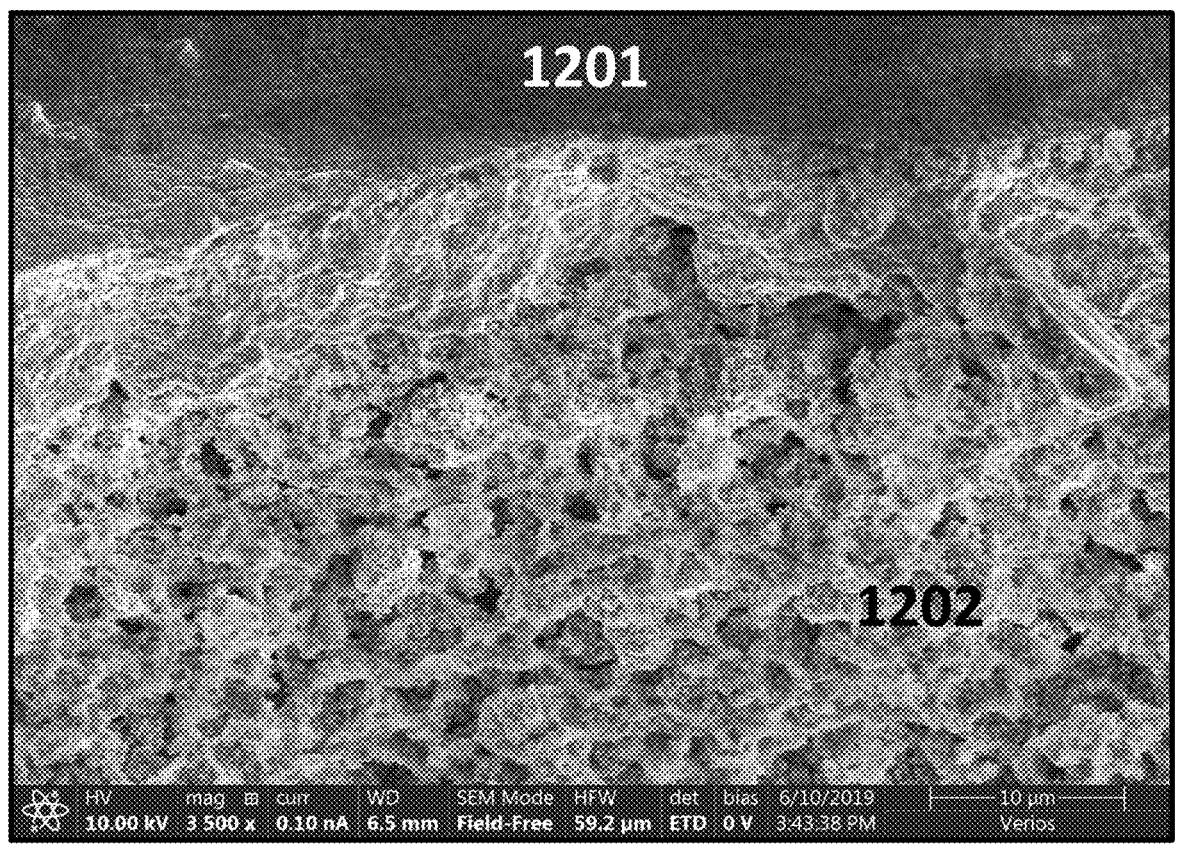
FIG. 4 is a scanning electron microscopy image (side view) illustrating an electrolyte (YSZ) printed and sintered on an electrode (NiO—YSZ), according to an embodiment of this disclosure.

Referring to FIG. 4, an electrolyte 1201 (YSZ) is printed and sintered on an electrode 1202 (NiO—YSZ). The scanning electron microscopy image shows the side view of the sintered structures, which demonstrates gas-tight contact between the electrolyte and the electrode, full densification of the electrolyte, and sintered and porous electrode microstructures.

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. A method of sintering a ceramic comprising
   a) providing a xenon lamp;
   b) (i) providing a layer of intermixed ceramic particles and absorber particles, wherein the absorber particles have a volume fraction in the intermixed particles in the range of no less than 3%; or (ii) providing a first layer comprising ceramic particles and a second layer comprising absorber particles in contact with at least a portion of the first layer, wherein the second layer is farther from the xenon lamp than the first layer; wherein the absorber particles are selected from the group consisting of ceramic particles, metal oxide particles, and combinations thereof;
   c) sintering (i) the intermixed particles or (ii) the ceramic particles in the first layer using the xenon lamp; and
   d) controlling the xenon lamp such that (i) at least a portion of the intermixed particles or (ii) at least a portion of the ceramic particles are sintered wherein the absorber particles have greater absorption than the ceramic particles.

2. The method of claim 1, wherein the ceramic particles comprise lanthanum strontium cobalt ferrite (LSCF), lanthanum strontium manganite (LSM), yttria-stabilized zirconia (YSZ), gadolinia-doped ceria (CGO), samaria-doped ceria (SDC), scandia-stabilized zirconia (SSZ), lanthanum strontium gallium magnesium oxide (LSGM), ceria-yttria stabilized zirconia (CYZ), ceria-scandia stabilized zirconia (CSZ), zirconia, lanthanum chromite, doped lanthanum chromite, or combinations thereof.

3. The method of claim 1, wherein the absorber particles comprise NiO, CuO, Cu$_2$O, LSCF, LSM, YSZ, doped YSZ, colored zirconia, lanthanum chromite, doped lanthanum chromite, or combinations thereof.

4. The method of claim 1 comprising providing an insulator layer that supports at least a portion of (i) the layer of the intermixed particles or (ii) the second layer, wherein the insulator layer is farther from the xenon lamp source than the layer of the intermixed particles or farther from the xenon lamp source than the second layer.

5. The method of claim 4, wherein the insulator comprises wood, wool, tile, foam, ceramic, alumina, felt, alumina felt, or combinations thereof.

6. The method of claim 1, wherein controlling the xenon lamp comprises controlling exposure duration, exposure frequency, number of exposures, exposure distance, capacitor voltage, or combinations thereof.

7. The method of claim 1, wherein the absorber particles transfer heat to the ceramic particles.

8. The method of claim 1, wherein a thickness of the layer of intermixed particles is no greater than 500 microns.

9. The method of claim 1, wherein a thickness of the first layer is no greater than 10 microns.

10. The method of claim 1, wherein the absorber particles have a volume fraction in the intermixed particles in the range of no less than 5%.

11. The method of claim 1, wherein (b) providing comprises depositing the intermixed particles, the ceramic particles, or the absorber particles on a substrate.

12. The method of claim 1, wherein the absorber particles do not exceed their melting temperature for greater than 10 consecutive seconds.

13. The method of claim 1, wherein the ceramic particles have a size distribution that has at least one of the following characteristics:
   a) said size distribution comprises D10 and D90, wherein 10% of the particles have a diameter no greater than D10 and 90% of the particles have a diameter no greater than D90, wherein D90/D10 is in the range of from 1.5 to 100; or
   b) said size distribution is bimodal such that the average particle size in the first mode is at least 5 times the average particle size in the second mode; or
   c) said size distribution comprises D50, wherein 50% of the particles have a diameter no greater than D50, wherein D50 is no greater than 400 nm.

14. The method of claim 13, wherein D10 is in the range of from 5 nm to 200 nm, or D90 is in the range of from 50 nm to 1000 nm, or wherein D90/D10 is in the range of from 2 to 100.

15. The method of claim 1, wherein a first 10 wt % or more of the ceramic particles have an average diameter of d, a second 10 wt % or more of the ceramic particles have an average diameter of at least 5×d, and a third 10 wt % or more of the ceramic particles have an average diameter of at least 20×d.

16. The method of claim 15, wherein d is in the range of from 1 nm to 100 nm.

17. The method of claim 15, wherein the third 10 wt % or more of the ceramic particles have an average of diameter of at least 36×d.

18. The method of claim 15, wherein the second 10 wt % or more of the ceramic particles have an average of diameter of at least 6×d.

* * * * *